R. F. BRYANT.
WHEEL TIRE.
APPLICATION FILED JAN. 23, 1908.
910,457. Patented Jan. 19, 1909.
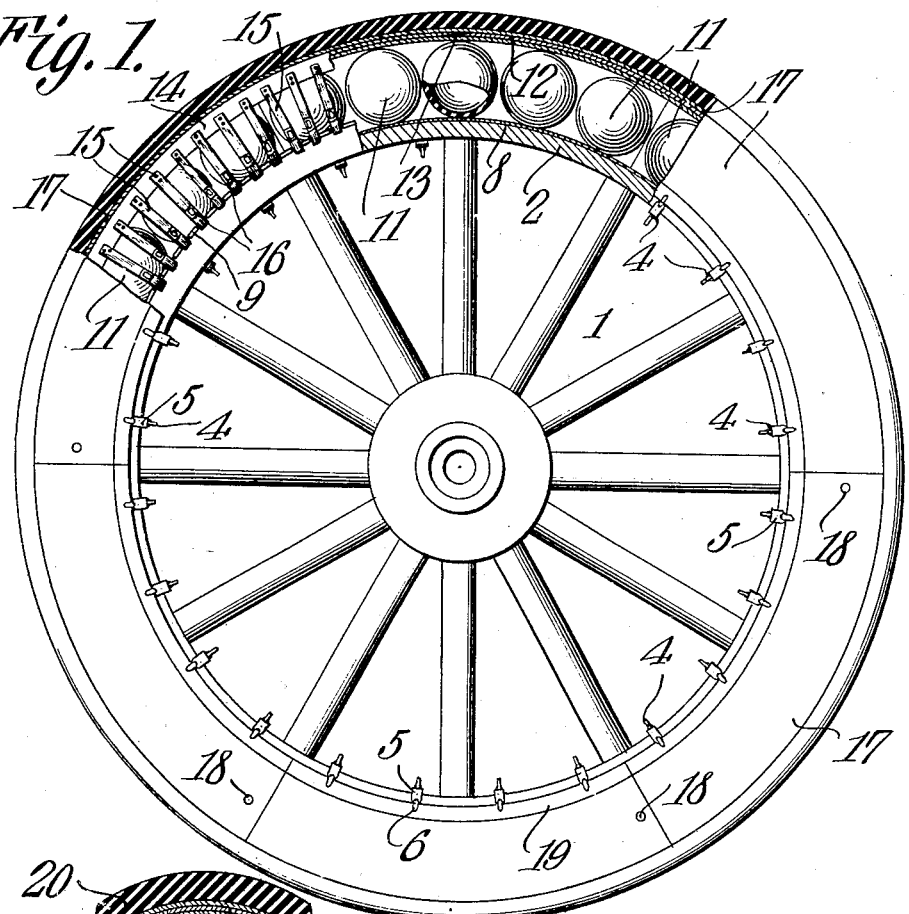
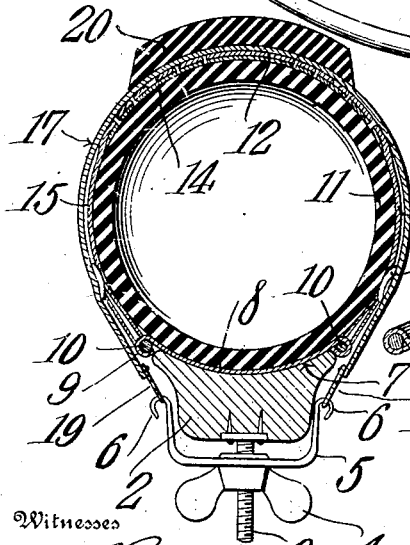
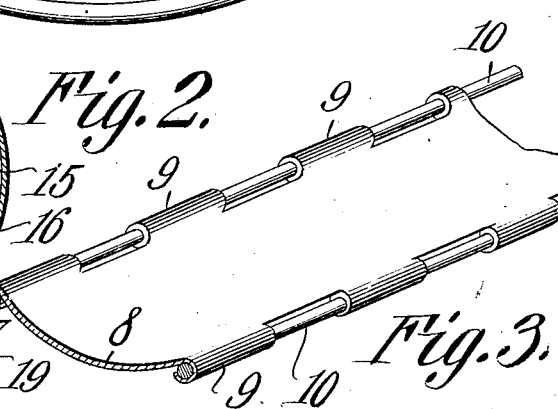
Inventor
Robert F. Bryant.

UNITED STATES PATENT OFFICE.

ROBERT FRANK BRYANT, OF BLOOMINGTON, ILLINOIS, ASSIGNOR OF ONE-FOURTH TO JOHN F. HARWOOD AND ONE-FOURTH TO JOHN H. WOOD, OF BLOOMINGTON, ILLINOIS.

WHEEL-TIRE.

No. 910,457.  Specification of Letters Patent.  Patented Jan. 19, 1909.

Application filed January 23, 1908. Serial No. 412,356.

*To all whom it may concern:*

Be it known that I, ROBERT FRANK BRYANT, a citizen of the United States, residing at Bloomington, in the county of McLean and State of Illinois, have invented a new and useful Wheel-Tire, of which the following is a specification.

This invention relates to pneumatic tires for vehicle wheels and its object is to provide a tire of this character utilizing a plurality of hollow resilient spheres, having novel means for securely holding them in position upon the wheel irrespective of the outer covering or tube of the tire.

A further object is to provide securing means of this character to which access can be conveniently had for the purpose of releasing one or more of the spheres so that the same can be repaired or new ones substituted should they be rendered useless.

Another object is to provide an outer tube or covering for the series of spheres, said covering being connected to the wheel rim in a novel manner and the various parts of which can be readily tightened upon the inclosed spheres.

Another object is to provide an outer covering consisting of separately removable sections.

A still further object is to combine armor with the sphere retaining means so that said spheres will be protected against accidental puncturing.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a wheel embodying the present improvements, portions of the wheel and tire being shown in section. Fig. 2 is a transverse section through the tire and the wheel felly. Fig. 3 is a detail view of a portion of the keeper of the sphere retaining means.

Referring to the figures by characters of reference, 1 designates a wheel, the rim or felly 2 of which is provided at regular intervals with inwardly extending screw threaded stems 3 secured to the inner face of the rim and having wing nuts 4 mounted upon them, each nut being swiveled within a yoke 5 which straddles the rim 2 and has terminal hooks 6.

Seated within the peripheral groove 7 in rim 2 is a metal hoop 8 having laterally extending ears 9 disposed at regular intervals and bent around circular rods or wires 10 for the purpose hereinafter set forth. These ears 9 support the rods 10 beyond the edges of rim 2 as indicated in Fig. 2. Mounted upon the hoop 8 is a series of hollow resilient spheres 11 preferably of soft rubber and these spheres support a series of arcuate, transversely curved plates 12 the ends of which are flattened and lap as indicated at 13. These plates rest upon and are riveted or otherwise secured to a fabric strip 14 of canvas or other suitable material and secured to the side portions of this fabric strip by means of rivets or in any other desired manner are straps 15 arranged close together and designed to be looped in engagement with the rods 10 and secured by buckles 16 or other devices. Obviously by tightening these straps the spheres 11 can be bound tightly upon hoop 8.

The outer tube or covering 17 of the tire is made up of segmental sections, the ends of which are designed to lap and to be detachably connected by snap fasteners 18. Each of these sections is made of suitable material such as canvas or rubber or both and has arcuate plates 19 secured along the curved edges thereof and provided with apertures for the reception of the hooks 6. The tread portion of this covering may be thickened as indicated at 20 or may be of any other preferred construction.

Should it be desired to remove one or more of the spheres, that section of the covering extending thereover is unfastened from the adjoining section and the yokes 5 which engage the covering section to be removed are adjusted toward the rim 2 by means of nuts 4 so as to enable the hooks 6 to become disengaged from plates 19. Said covering section can then be removed from the wheel and certain of the spheres together with their holding straps, will thus be exposed to view. By unfastening the straps adjoining the sphere or spheres to be removed said spheres can be readily withdrawn from their positions between the armor plates 12 and the hoop 8. After the spheres have been repaired or new ones substituted, the straps are again secured in place and the covering section placed in position with its plates 19 engaging the hooks 6. By adjusting the nuts 4 the hooks 6 can be caused to pull on plates 19 and thus tighten the covering section upon the armor and spheres. After the replaced section of the covering has been fastened to the adjoining sections by means of the snaps 18 the tire is ready for use.

It will be seen that this device can be easily repaired without the necessity of removing the entire tire from the wheel.

What is claimed is:

1. The combination with a wheel rim having a peripheral groove; of a hoop seated within the groove and concavo-convex in cross section, said hoop having spaced marginal ears, holding rods extending through the ears at each side of the hoop, a series of elastic balls mounted upon the hoop, a flexible strip surrounding the balls flexible holding devices connecting the edges of the strip with the adjoining portions of the rods, and a tread.

2. The combination with a wheel rim; of a series of resilient spheres extending around the rim, a flexible strip surrounding said spheres, straps adjustably connecting the strip and rim for holding the spheres against displacement, stems secured to and fixed relative to the rim, yokes adjustably mounted upon the stems and straddling the rim, a flexible covering extending around the balls and towards opposite sides of the rim, apertured plates secured to the edge portions of said covering and detachably engaged by the yokes, and a tread upon the flexible covering.

In testimony that I claim the foregoing as my own, I have hereto affixed my signature in the presence of two witnesses.

ROBERT FRANK BRYANT.

Witnesses:
JAS. M. WALKER,
WM. J. NEALE.